(12) United States Patent
Molin et al.

(10) Patent No.: US 6,591,999 B1
(45) Date of Patent: Jul. 15, 2003

(54) OPENING DEVICE FOR PACKAGES OF POURABLE FOOD PRODUCTS

(75) Inventors: Ola Molin, Svedala (SE); Janne Lundqvist, Sjöbo (SE); Paul Trägårdh, Löddeköpinge (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/702,897

(22) Filed: Nov. 1, 2000

(30) Foreign Application Priority Data

Dec. 14, 1999 (EP) .............................. 99124959

(51) Int. Cl.$^7$ .............................................. B65D 51/20
(52) U.S. Cl. ..................... 220/258.1; 222/541
(58) Field of Search ................. 220/258.1–258.5, 220/256.1, 265–273, 274; 215/256, 234, 255; 229/125.15; 222/541

(56) References Cited

U.S. PATENT DOCUMENTS

| | | | |
|---|---|---|---|
| 3,142,412 A | * 7/1964 | Blakeslee | 220/270 |
| 3,182,852 A | * 5/1965 | Wilkinson | 220/270 |
| 3,401,820 A | * 9/1968 | Taylor | 220/54 |
| 3,416,699 A | * 12/1968 | Bozek | 220/271 |
| 3,424,338 A | * 1/1969 | Kazel | 220/54 |
| 3,434,622 A | * 3/1969 | Czegledy | 220/54 |
| 3,441,167 A | * 4/1969 | Balocca | 220/271 |
| 3,610,484 A | 10/1971 | Matzka | |
| 4,002,262 A | * 1/1977 | Khoury | 220/271 |
| 4,044,915 A | * 8/1977 | LaCroce et al. | 220/270 |
| 4,182,460 A | * 1/1980 | Holk et al. | 220/271 |
| 4,405,056 A | * 9/1983 | Patterson | 220/271 |
| 4,572,398 A | 2/1986 | Juty | |
| 4,930,658 A | * 6/1990 | McEldowney | 220/269 |
| 5,133,486 A | * 7/1992 | Moore et al. | 222/541 |
| 5,735,426 A | * 4/1998 | Babcock et al. | 220/258 |
| 5,819,973 A | * 10/1998 | Traub, Sr. et al. | 220/271 |

FOREIGN PATENT DOCUMENTS

EP 0449373 A1 10/1991
WO WO 98/18684 5/1998

OTHER PUBLICATIONS

European Search Report dated Mar 15, 2000.

* cited by examiner

Primary Examiner—Lee Young
Assistant Examiner—Lien Ngo
(74) Attorney, Agent, or Firm—Burns, Doane, Swecker & Mathis, L.L.P.

(57) ABSTRACT

An opening device for packages of pourable food products, having a frame defining a pour opening; a partition member connected to the frame to close the pour opening, and which is detachable from the frame along a preferential tear line; and an opening member connected to the partition member and which is pulled to detach the partition member from the frame and so expose the pour opening; the opening device also having an air inlet hole formed in the partition member; and a bridge member connecting the opening member to the lateral edge of the hole in the partition member, and which is broken by operation of the opening member to allow air through the hole prior to commencing detachment of the partition member from the frame.

11 Claims, 6 Drawing Sheets

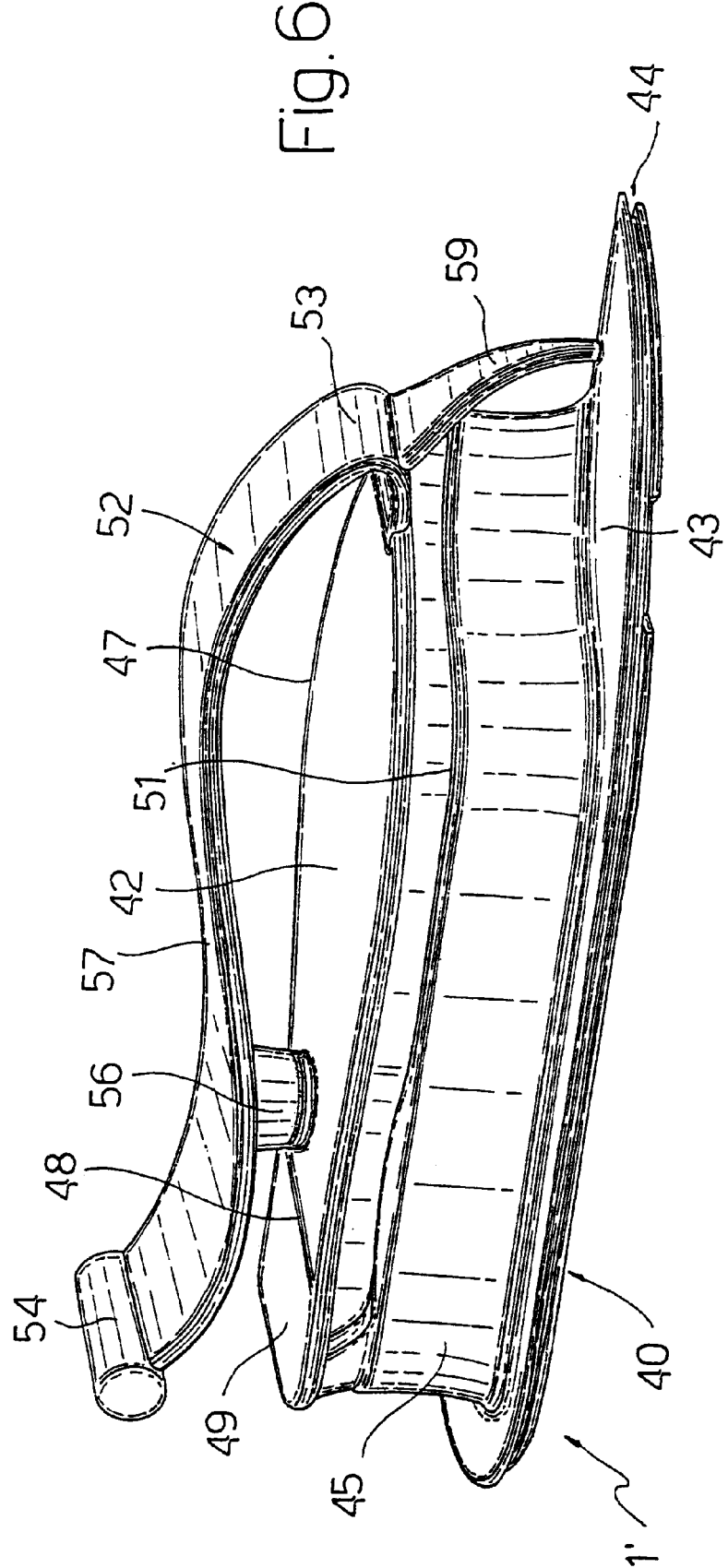

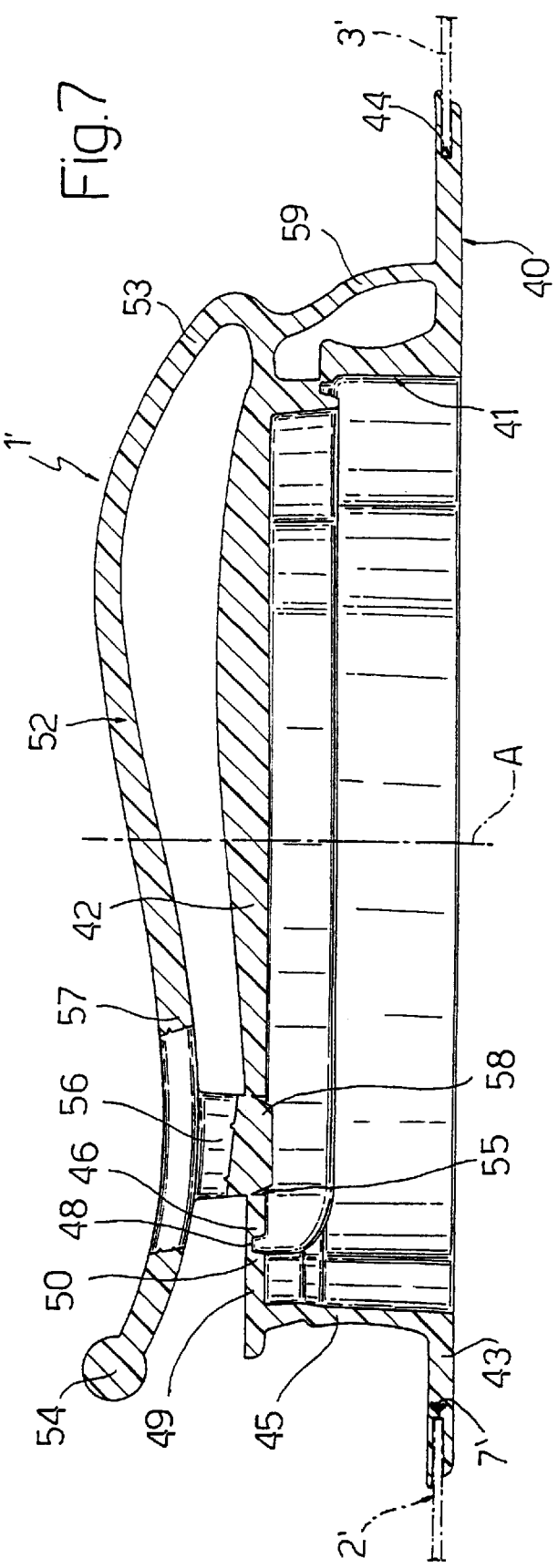

OPENING DEVICE FOR PACKAGES OF POURABLE FOOD PRODUCTS

The present invention relates to an opening device for packages of pourable food products.

Many pourable food products, such as fruit juice, UHT milk, wine, tomato sauce, etc., are sold in packages made of sterilized packaging material.

A typical example of such a package is the parallelepiped-shaped package for liquid or pourable food products known as Tetra Brik or Tetra Brik Aseptic (registered trademarks), which is formed by folding and sealing laminated strip packaging material. The packaging material has a multilayer structure comprising a layer of fibrous material, e.g. paper, covered on both sides with layers of thermoplastic material, e.g. polyethylene, and, in the case of aseptic packages for long-storage products, such as UHT milk, also comprises a layer of barrier material defined, for example, by an aluminum film, which is superimposed on a layer of thermoplastic material and is in turn covered with another layer of thermoplastic material eventually defining the inner face of the package contacting the food product.

As is known, such packages are produced on fully automatic packaging units, on which a continuous tube is formed from the packaging material supplied in strip form; the strip of packaging material is sterilized on the packaging unit itself, e.g. by applying a chemical sterilizing agent, such as a hydrogen peroxide solution, which, after sterilization, is removed, e.g. vaporized by heating, from the surfaces of the packaging material; and the strip of packaging material so sterilized is maintained in a closed sterile environment, and is folded and sealed longitudinally to form a tube.

The tube is filled with the sterilized or sterile-processed food product, and is sealed and cut at equally spaced cross sections to form pillow packs, which are then folded mechanically to form the finished, e.g. substantially parallelepiped-shaped, packages.

Alternatively, the packaging material may be cut into blanks, which are formed into packages on forming spindles, and the resulting packages are filled with the food product and sealed. One example of such a package is the "gable-top" package commonly known as Tetra Rex (registered trademark).

Opening devices for packages of the above type are known which substantially comprise a frame defining a pour opening and fitted over a hole in one wall of the package; a partition member connected to the frame to close the pour opening, and which is detached from the frame along a preferential tear line; and a pull-off tab having one end connected to the partition member, and which is pulled by the free opposite end to detach the partition member from the frame along the preferential tear line and so expose the pour opening.

When the preferential tear line is a closed line, so that the partition member is detached completely from the frame, such opening devices also comprise a threaded cap, which is fitted to the frame to close the pour opening once the partition member is removed.

Though efficient, opening devices of the above type still leave room for further improvement.

One problem posed by this sort of opening device is that, when removing the partition member, the pressure applied on the lateral walls of the package by the user's hand holding the package may result in some of the product squirting out.

Moreover, opening devices of the type described normally feature tamperproof members, such as plastic rings connected coaxially to the caps by radial, break-off connecting points, the condition of which is not always easily discernible by the consumer at the time of purchase, with the obvious consequences this entails.

It is an object of the present invention to provide an opening device for packages of pourable food products, designed to eliminate the aforementioned drawbacks typically associated with known opening devices.

According to the present invention, there is provided an opening device for a package containing a pourable food product, said device comprising a peripheral member defining a pour opening; a partition member connected to said peripheral member to close said pour opening, and which is at least partly detachable from the peripheral member along at least a first preferential tear line; and an opening member connected to said partition member and which is operated to detach the partition member from said peripheral member along said first preferential tear line and so expose said pour opening; characterized by comprising an air inlet hole formed in said partition member; and a bridge member connecting said opening member to said partition member and having sealing means for sealing said hole and which are broken by operation of said opening member to allow air through the hole prior to commencing detachment of said partition member from said peripheral member.

Two preferred, non-limiting embodiments of the present invention will be described by way of example with reference to the accompanying drawings, in which:

FIG. 6 shows a view in perspective of a further embodiment of the opening device according to the present invention;

FIG. 7 shows a cross section of the FIG. 6 opening device.

Figure 1:
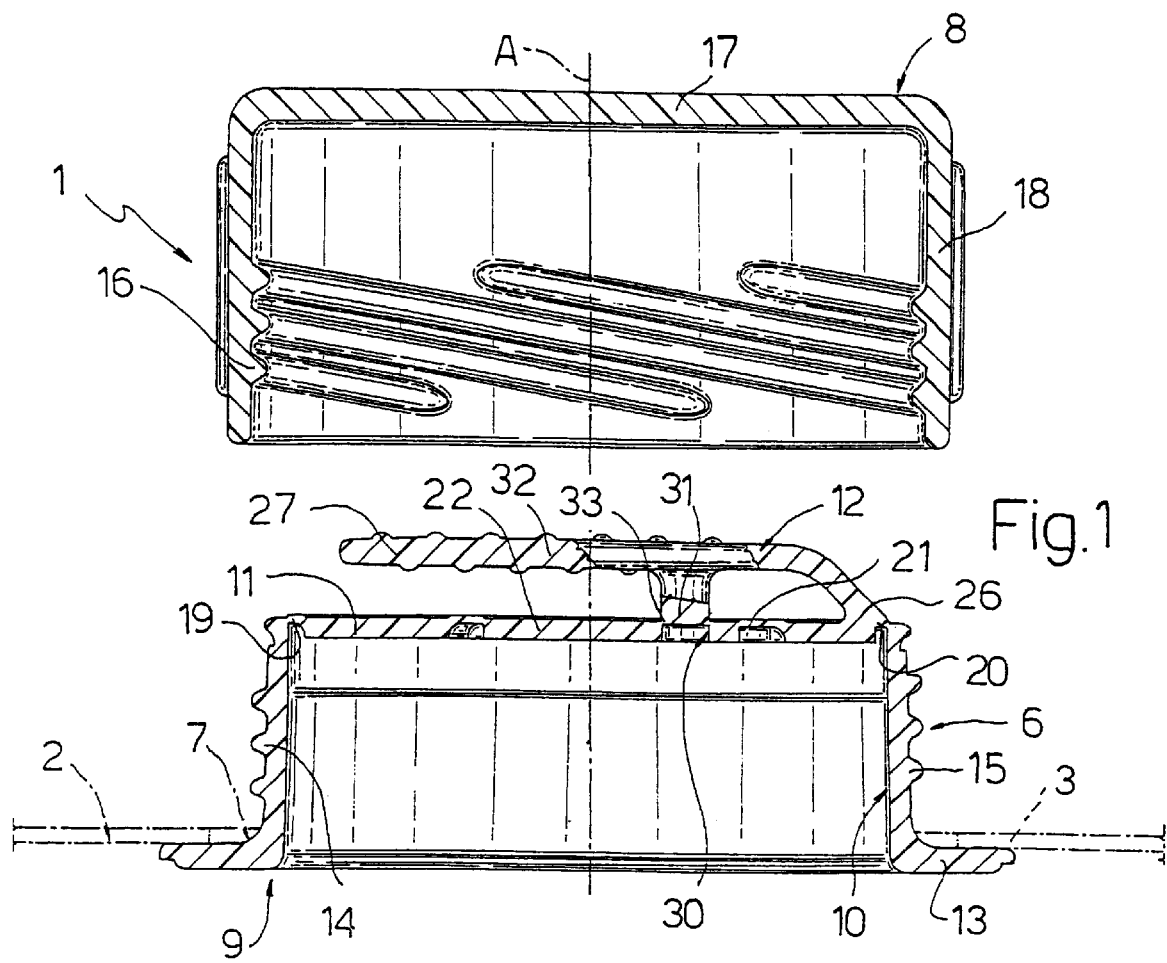
FIG. 1 shows an exploded axial section of an opening device in accordance with the present invention applied to a wall of a sealed package for pourable food products.

Number 1 in FIG. 1 indicates as a whole a closable opening device made of plastic material and applied to a sealed package 2 (shown fully in FIGS. 3 and 4) for containing a pourable food product and made from sheet packaging material as described in detail previously.

The packaging material has a multilayer structure (not shown), and comprises a layer of fibrous material, normally paper, covered on both sides with respective layers of thermoplastic material, e.g. polyethylene. In the case of aseptic packages for long-storage products such as UHT milk, the packaging material also comprises, on the side eventually contacting the food product in package 2, a layer of barrier material, e.g. aluminum, in turn covered with one or more layers of thermoplastic material.

Figure 2:
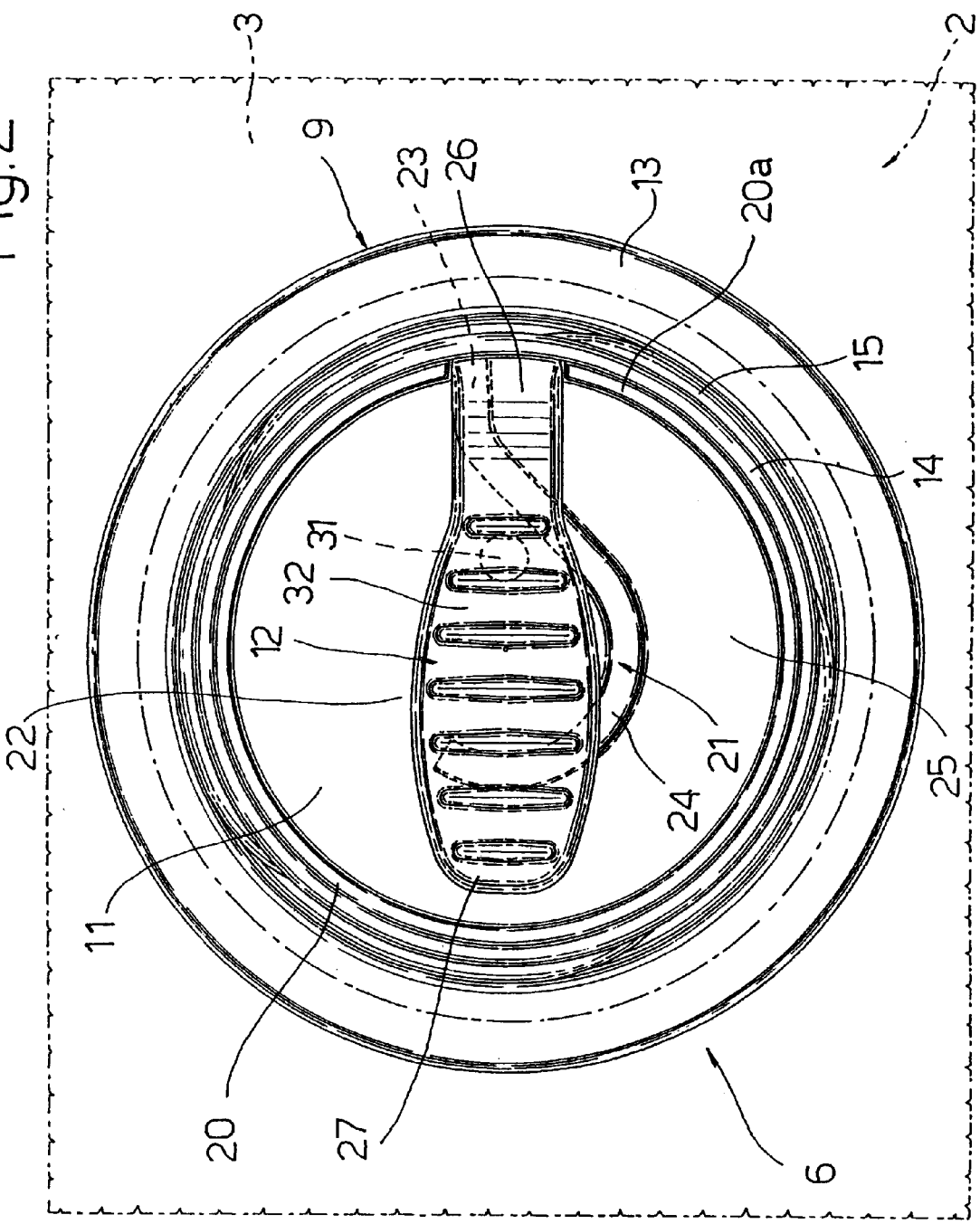
FIG. 2 shows a top plan view of a base assembly of the opening device according to the present invention, fitted closing a pour hole in the FIG. 1 package.
Figure 3:
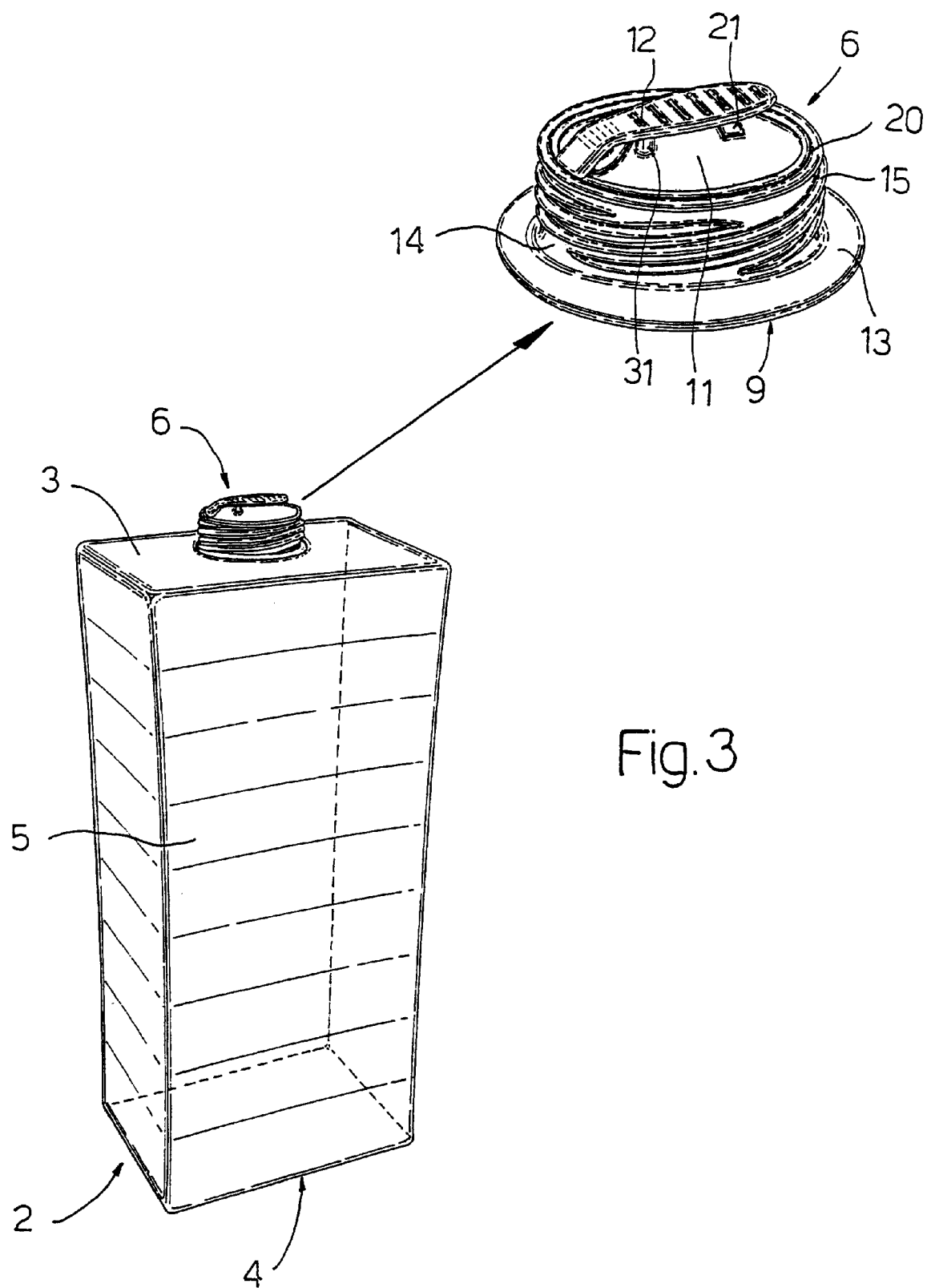
FIG. 3 shows a view in perspective of the FIG. 1 package and respective base assembly in the sealed configuration.
Figure 4:
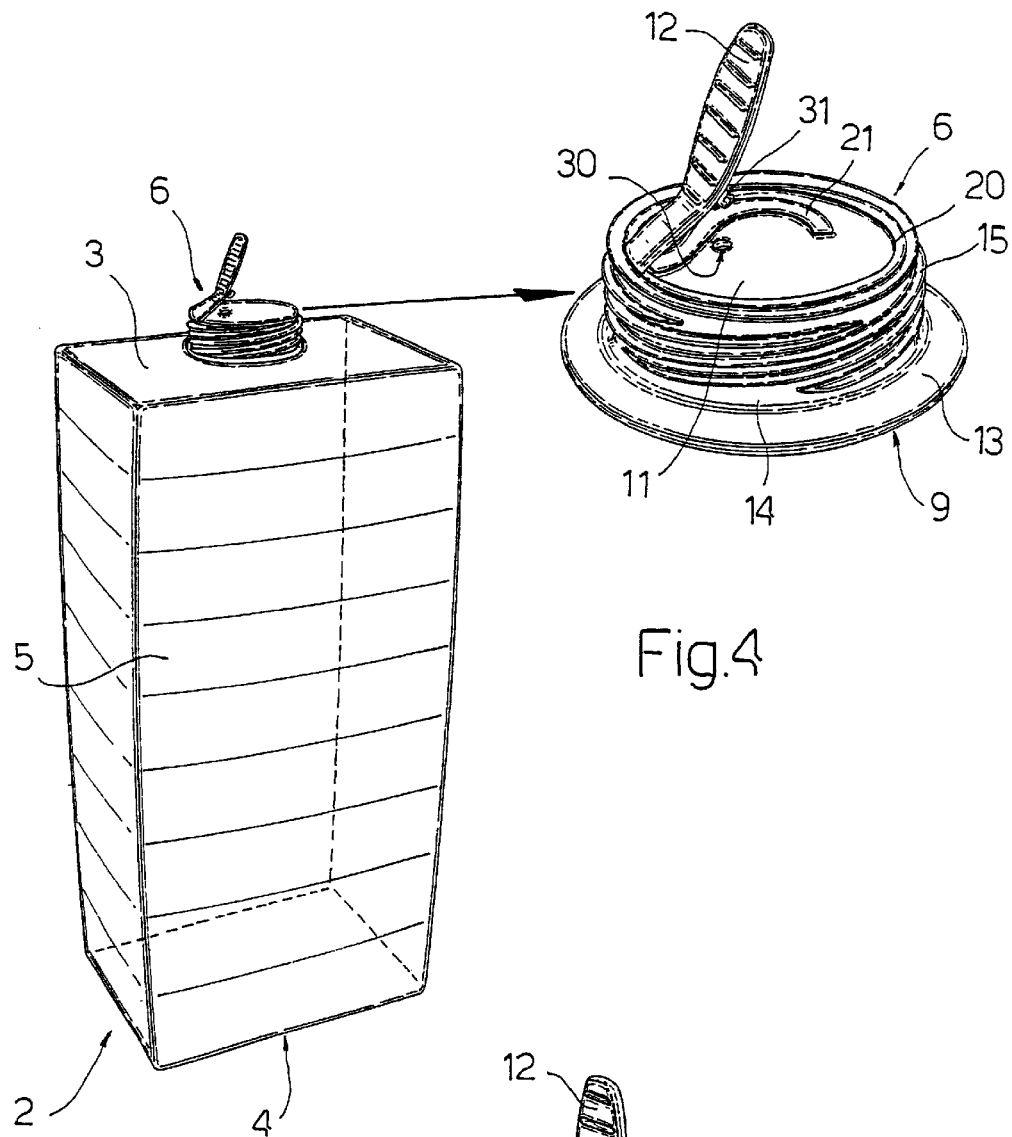
FIG. 4 shows a view in perspective of the FIG. 1 package and respective base assembly at an initial stage in the opening of the package.
Figure 5:
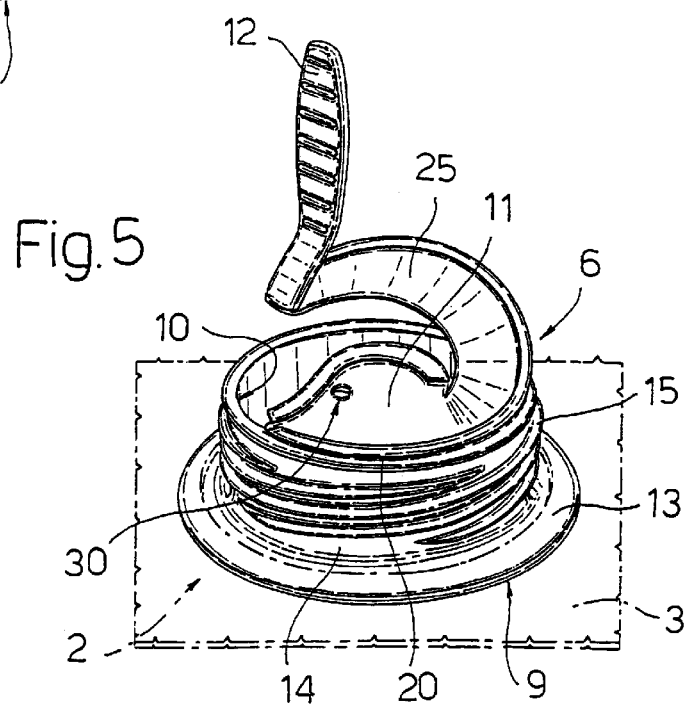
FIG. 5 shows a view in perspective of the FIGS. 1–4 base assembly at an intermediate stage in the opening of the package.

With particular reference to FIGS. 3 and 4, package 2 is in the form of a substantially parallelepiped-shaped box, and comprises a top wall 3 (a portion of which is also shown in FIGS. 1, 2 and 5) fitted with opening device 1; a bottom wall 4; and four lateral walls 5.

The volume of the food product in package 2 is normally less than the maximum capacity of the package, so that, when subjected to external pressure by the user's hand gripping the package, lateral walls 5 assume a slightly concave shape (FIG. 3).

With reference to FIG. 1, opening device 1 comprises a partially removable base assembly 6, which is substantially cylindrical and fitted to top wall 3 of package 2 to close a through hole 7 in wall 3; and a removable cap 8 formed separately from and fitted coaxially to base assembly 6.

As described, for example, in International Patent Application WO98/18684, the content of which is considered included herein, base assembly 6 is preferably formed by injection molding plastic material directly on to the sheet packaging material, prior to folding and sealing the sheet packaging material to form package 2.

More specifically, the plastic material is injected through a respective hole 7, formed in the sheet packaging material, between two mold members (not shown) cooperating with each other on opposite sides of the packaging material.

With reference to FIGS. 1 to 5, base assembly 6 comprises, integrally, a substantially cylindrical tubular frame 9 fitted about hole 7 on wall 3 of package 2 and defining a through opening 10, of axis A, through which to pour the food product; a removable circular partition member 11 connected coaxially to frame 9 to close opening 10; and a lever-type grip member 12 connected to the outer face of partition member 11, and which is pulled to remove partition member 11 and expose opening 10.

More specifically, in the illustrated example frame 9 comprises an annular end flange 13 positioned surrounding hole 7 and contacting the side of the packaging material of wall 3 inside package 2; and a cylindrical collar 14, of axis A, extending through hole 7 from an inner peripheral edge of flange 13 and projecting outwards of package 2. The flange 13 may also be arranged, according to requirements, contacting the outside or both sides of the packaging material of wall 3.

The radially outer lateral surface of collar 14 has a thread 15, which is engaged, in use, by a corresponding thread 16 on cap 8. More specifically, cap 8 comprises, integrally, a circular disk-shaped portion 17; and a cylindrical annular portion 18, which has thread 16 on the inside, projects from an outer peripheral edge of disk-shaped portion 17, and is screwed to collar 14 of frame 9.

Once partition member 11 is removed, cap 8 can be set to a closed configuration, in which the cap is screwed to frame 9 so that disk-shaped portion 17 closes opening 10, and to an open configuration, in which the cap is detached from frame 9.

With particular reference to FIG. 1, partition member 11 is molded integrally with frame 9 and is initially sealed peripherally to an end edge 19 of collar 14, at the opposite end to flange 13, by a thin tearable annular connecting portion defining a closed preferential tear line 20.

Partition member 11 may also be provided with a further or secondary preferential tear line 21 (FIG. 2) extending from a peripheral edge of partition member 11 towards a central portion 22 of partition member 11, and defined by a thin weakened portion.

More specifically, secondary preferential tear line 21 comprises a first radial portion 23 extending from the peripheral edge of partition member 11, and therefore from preferential tear line 20; and a substantially semicircular second portion 24, which is formed in central portion 22 of partition member 11, is connected to portion 23, and extends at a constant distance from a relative portion 20a of preferential tear line 20, and therefore from a corresponding portion of end edge 19 of collar 14.

Together with portion 20a of preferential tear line 20, secondary preferential tear line 21 defines a curved strip 25 of partition member 11, which, when grip member 12 is operated, is detached first from frame 9.

With reference to FIGS. 1 to 5, grip member 12 is defined by a tongue of plastic material comprising a first end portion 26 connected integrally to partition member 11, close to the peripheral edge portion of partition member 11 from which secondary preferential tear line 21 extends; and a second free operating end portion 27 having a number of ribs for easy grip.

Grip member 12 is formed in a molding position (FIGS. 1, 2 and 3) extending substantially parallel to partition member 11, and is pulled from the molding position into a raised initial package 2 opening position (FIG. 4) in which grip member 12 is set crosswise to partition member 11.

An important aspect of the present invention is that base assembly 6 also comprises a through hole 30 formed in central portion 22 of partition member 11 to allow air inside package 2; and a bridge member 31 connecting an intermediate portion 32 of grip member 12 to partition member 11, and having an end edge 33, which is engaged inside an axial portion of hole 30 facing outwards of package 2, is initially sealed to a lateral edge of hole 30, and is detached from partition member 11 when grip member 12 is pulled from the molding position to the initial opening position, so as to allow air into package 2 prior to commencing detachment of partition member 11 from frame 9.

In the example shown, bridge member 31 is defined by a cylindrical projection projecting from intermediate portion 32 of grip member 12.

In actual use, package 2 is opened by unscrewing cap 8 off base assembly 6 and acting on grip member 12 in the molding position.

Grip member 12 is first raised into the initial opening position, then pulled to rupture the annular preferential tear line 20. If the secondary preferential tear line 21 is also provided, after raising the grip member 12, it can be pulled to the side, clockwise in FIG. 2, to detach partition member 11 completely from frame 9.

More specifically, as grip member 12 is raised from the molding position to the initial opening position, the connection between end edge 33 of bridge member 31 and the lateral edge of hole 30 is broken, thus allowing air into package 2 to lower the level of the food product inside and swell package 2 itself. More specifically, the lateral walls 5 of package 2 assume an outwardly convex configuration (FIG. 4).

At this point, when grip member 12 is pulled clockwise in FIG. 2, strip 25 of partition member 11 extending between secondary preferential tear line 21 and portion 20a of preferential tear line 20 is detached; strip 25 is raised, and, once detached along the whole of secondary preferential tear line 21, detachment of partition member 11 from frame 9 continues along the remaining portion of preferential tear line 20 until partition member 11 is detached completely from frame 9.

Allowing air into package 2 through hole 30 prior to commencing actual detachment of partition member 11 from frame 9 provides for the following advantages.

Firstly, the product is prevented from squirting out when removing partition member 11 to open package 2. And, secondly, the swelling of package 2, due to the air allowed through hole 30 when pulling up grip member 12, is an immediate indication to the user, both visually and by touch, of the soundness of package 2.

Number 1' in FIGS. 6 and 7 indicates as a whole a further embodiment of an opening device for a sealed package 2' containing a pourable food product and which is identical to package 2 and shown only partly by the dash-and-dot line in FIG. 7. Opening device 1' is described below only insofar as it differs from opening device 1, and using the same reference numbers for any parts identical with or corresponding to those already described.

Opening device 1' comprises a frame 40 having a substantially ogival lateral profile, defining a pour opening 41 of axis A, and fitted to a top wall 3' of package 2', at a hole 7' in wall 3'; and a partition member 42 connected to frame 40 to close opening 41.

Frame 40 comprises an annular end flange 43 fitted through hole 7' in wall 3' and having, along its own peripheral edge, an annular groove 44 for receiving the packaging material defining the edge of hole 7'.

Frame 40 also comprises an annular collar 45 extending through hole 7' from an inner peripheral edge of flange 43 and projecting outwards from package 2'.

Partition member 42 has a substantially ogival profile defined by a straight end edge 46, and by a U-shaped lateral edge 47 extending from opposite ends of end edge 46.

Partition member 42 is secured, along end edge 46 and by means of a hinge 48, to a substantially flat appendix 49 of collar 45 partly covering opening 41 on the opposite side to flange 43. Hinge 48 is defined by a thin strip of material extending between end edge 46 of partition member 42 and a straight end edge 50 of appendix 49.

Partition member 42 is molded integrally with frame 40, and is initially sealed to the frame, along lateral edge 47, by a thin tearable connecting portion defining a U-shaped preferential tear line 51, the opposite ends of which are located close to the opposite sides of hinge 48.

As shown particularly in FIG. 6, hinge 48 defines, with preferential tear line 51, an integral annular connecting portion between partition member 42 and collar 45 of frame 40.

As before, opening device 1' is also formed, as described in International Patent Application WO98/18684, by injection molding plastic material directly on to the sheet packaging material, prior to folding and sealing the sheet packaging material to form package 2'.

Opening device 1' also comprises a grip member 52 identical with grip member 12 and having a first end portion 53 connected integrally to partition member 42 at an end portion of lateral edge 47 opposite end edge 46, and a second free operating end portion 54.

Grip member 52 is formed in a molding position extending substantially parallel to partition member 42, and is pulled from the molding position into a raised initial package 2' opening position in which grip member 52 is set crosswise to partition member 42.

In exactly the same way as for base assembly 6, opening device 1' also comprises a through hole 55 formed in partition member 42 to allow air inside package 2'; and a bridge member 56 connecting an intermediate portion 57 of grip member 52 to partition member 42, and having an end edge 58, which is engaged inside hole 55, is initially sealed to a lateral edge of hole 55, and is detached from partition member 42 when grip member 52 is pulled from the molding position to the initial opening position, so as to allow air into package 2' prior to commencing detachment of partition member 42 from frame 40.

Opening device 1' also comprises a tamperproof member 59 defined by a break-off tongue extending between end portion 53 of grip member 52 and flange 43 of frame 40, and tapering in section towards flange 43.

Package 2' fitted with opening device 1' is opened in exactly the same way as already described for package 2.

Once package 2' is opened, partition member 42 defines a closable cap connected to frame 40 by hinge 48 and movable between a closed position, in which lateral edge 47 is engaged in sealed manner inside collar 45 of frame 40, and an open position.

Clearly, changes may be made to opening devices 1, 1' as described and illustrated herein without, however, departing from the scope of the accompanying claims.

What is claimed is:

1. An opening device for a package containing a pourable food product, said device comprising:
   a peripheral member defining a pour opening;
   a partition member connected to said peripheral member to close said pour opening, and which is at least partly detachable from the peripheral member along at least a first preferential tear line;
   an opening member connected to said partition member and which is operated to detach the partition member from said peripheral member along said first preferential tear line and so expose said pour opening;
   an air inlet hole being formed in said partition member;
   a bridge member connecting said opening member to said partition member and having sealing means for sealing said hole and which are broken by operation of said opening member to allow air through the hole prior to commencing detachment of said partition member from said peripheral member, said opening member being arranged in a position overlaying said partition member, said sealing means and said hole which is broken by operation of said opening member;
   said opening member comprising a tongue having a first end portion connected to a peripheral edge portion of said partition member, a free, pull-up second end portion, and an intermediate portion connected to a central portion of said partition member by said bridge member wherein said partition member, said opening member, said bridge member, and said sealing means are one piece formed and made from a plastic material.

2. An opening device as claimed in claim 1, wherein said sealing means comprise an end edge of said bridge member, engaged inside said hole and connected to at least one axial portion of a lateral edge of the hole.

3. An opening device as claimed in claim 1, wherein said partition member comprises a weakening portion defining a second preferential tear line enabling detachment of the partition member from said peripheral member when said opening member is operated.

4. An opening device as claimed in claim 3, wherein said second preferential tear line comprises at least one portion extending at a constant distance from a relative portion of said first preferential tear line.

5. An opening device as claimed in claim 1, wherein said partition member is substantially circular; and in that said hole is formed in a central portion of said partition member.

6. An opening device as claimed in claim 1, wherein said peripheral member comprises a frame having connecting means for connection to a closable cap.

7. An opening device as claimed in claim 6, wherein said connecting means comprise a thread formed on said frame and which is engaged by a complementary thread carried by said cap.

8. A package for pourable food products, comprising:
   a container body having a top wall fitted with an opening device;
   said opening device comprising a peripheral member defining a pour opening;

a partition member connected to said peripheral member to close said pour opening, and which is at least partly detachable from the peripheral member along at least a first preferential tear line;

an opening member connected to a peripheral edge portion of said partition member and which is operated to detach the partition member from said peripheral member along said first preferential tear line and so expose said pour opening;

an air inlet hole being formed in said partition member;

a bridge member connecting said opening member to said partition member and having sealing means for sealing said hole and which are broken by operation of said opening member to allow air through the hole prior to commencing detachment of said partition member from said peripheral member, said opening member being arranged in a position overlaying said partition member, said sealing means and said hole which is broken by operation of said opening member;

said opening member comprising a tongue having a first end portion connected to said partition member, a free, pull-up second end portion, and an intermediate portion connected to a central portion of said partition member by said bridge member wherein said partition member, said opening member, said bridge member, and said sealing means are one piece formed and made from a plastic material.

9. A package as claimed in claim 8, wherein said peripheral member is fitted to a wall of the package.

10. A package as claimed in claim 8, wherein at least part of said opening device is injection molded directly on to a sheet packaging material defining said package.

11. An opening device for a package containing a pourable food product, said device comprising:

a peripheral member defining a pour opening;

a partition member connected to said peripheral member to close said pour opening, the partition member at least partly detachable from the peripheral member along at least a first preferential tear line; and an opening member overlaying and connected to the partition member, the opening member including a tongue having a first end portion connected to a peripheral edge portion of the partition member, a free, pull-up second end portion, and an intermediate portion connected to a central portion of the partition member by a bridge member, the bridge member connecting the opening member to the partition member and having sealing means for sealing an air inlet hole formed in the partition member, wherein the opening member is operable to detach the partition member from the peripheral member along the first preferential tear line to expose the pour opening and is operable to open the sealing means to allow air through the hole prior to commencing detach of said partition member from the peripheral member, wherein the partition member, the opening member, the bridge member, and the sealing means are one piece structure and the one piece structure is formed of a thermoplastic.

* * * * *